United States Patent
Widegren et al.

(10) Patent No.: US 9,167,532 B2
(45) Date of Patent: Oct. 20, 2015

(54) RADIO BASE STATION, A NETWORK CONTROL NODE AND METHODS THEREIN FOR OUTER LOOP POWER CONTROL IN DUAL-CARRIER HSUPA

(75) Inventors: Ina Widegren, Stockholm (SE); Martin Israelsson, Spånga (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 1066 days.

(21) Appl. No.: 13/256,144

(22) PCT Filed: Mar. 16, 2010

(86) PCT No.: PCT/SE2010/050291
§ 371 (c)(1),
(2), (4) Date: Sep. 12, 2011

(87) PCT Pub. No.: WO2010/107377
PCT Pub. Date: Sep. 23, 2010

(65) Prior Publication Data
US 2012/0002610 A1 Jan. 5, 2012

Related U.S. Application Data

(60) Provisional application No. 61/160,796, filed on Mar. 17, 2009.

(51) Int. Cl.
H04W 52/12 (2009.01)
H04W 52/14 (2009.01)
H04W 52/28 (2009.01)
H04W 52/40 (2009.01)
H04W 52/48 (2009.01)
H04W 52/24 (2009.01)

(52) U.S. Cl.
CPC ............ *H04W 52/12* (2013.01); *H04W 52/146* (2013.01); *H04W 52/286* (2013.01); *H04W 52/40* (2013.01); *H04W 52/48* (2013.01); *H04W 52/241* (2013.01)

(58) Field of Classification Search
CPC ........................................ H04W 52/04–52/54
See application file for complete search history.

(56) References Cited

U.S. PATENT DOCUMENTS

| 2008/0273454 A1* | 11/2008 | Malkamaki et al. | 370/216 |
| 2010/0137017 A1* | 6/2010 | Lin et al. | 455/522 |
| 2010/0172428 A1* | 7/2010 | Pani et al. | 375/262 |

FOREIGN PATENT DOCUMENTS

| WO | 2004/091114 A1 | 10/2004 |
| WO | 2006/059172 A1 | 6/2006 |

OTHER PUBLICATIONS

Seidel et al., White Paper—Dual Cell HSDPA and its Future Evolution, published Jan. 2009.*
3GPP TSG RAN WG2, R2-087441 "Introduction to Dual Cell operation", Nov. 10, 2008.*
3RD Generation Partnership Project. "Considerations on DC-HSUPA Operation." 3GPP TSG RAN WG1 Meeting #56, R1-090886, Athens, Greece, Feb. 9-13, 2009.

* cited by examiner

Primary Examiner — Khaled Kassim
Assistant Examiner — Zhaohui Yang
(74) Attorney, Agent, or Firm — Coats & Bennett, PLLC (57) ABSTRACT

The invention relates to a radio base station (13) for handling Outer Loop Power Control of a user equipment (12) in a radio communications network of a multiple cell (10,11) High Speed Uplink Packet Access configuration: The user equipment (12) is connected to at least two cells (10,11) using at least two carriers, one cell per carrier, wherein the radio base station (13) reports number of hybrid automatic repeat requests of the two or more carriers to a network control node (14). The radio base station (13) and the network control node (14) are comprised in the radio communications network. The radio base station determines (401) a number of hybrid automatic repeat requests over a first carrier of the at least two or more carriers, and signals (402) a user plane frame to the network control node (14). The user plane frame comprises the determined number of hybrid automatic repeat requests and an identity associated to the first carrier, enabling the network control node (14) to control an Outer Loop Power Control parameter to be used in an Outer Loop Power Control process for the first carrier.

16 Claims, 7 Drawing Sheets

RADIO BASE STATION, A NETWORK CONTROL NODE AND METHODS THEREIN FOR OUTER LOOP POWER CONTROL IN DUAL-CARRIER HSUPA

TECHNICAL FIELD

The invention relates to a radio base station, a method in a radio base station, a network control node and a method in a network control node. The invention especially relates to handle Outer Loop Power Control in a radio telecommunications network.

BACKGROUND

In today's' radio communications networks, such as Wideband Code Division Multiple Access (WCDMA) networks, High Speed Packet Access (HSPA) has been introduced. HSPA uses High Speed Downlink Packet Access (HSDPA) and High Speed Uplink Packet Access (HSUPA) and improves the performance of existing WCDMA networks. In HSUPA, work is ongoing to introduce multiple cell HSUPA, such as Dual-cell HSUPA. An objective with the work item is to specify Dual-cell HSUPA operation for the following scenario:
  The dual carrier transmission only applies to HSUPA Uplink (UL) physical channels and Dedicated Physical Control Channel (DPCCH), the uplink DPCCH is used to carry the Dedicated Channel (DCH) transport channel
  The carriers belong to the same Node-B, also known as radio base station, and are on adjacent carriers,
  Operation with at least 2 carriers configured simultaneously in downlink In single carrier Enhanced Dedicated channel (E-DCH) operation, the Outer Loop Power Control (OLPC) parameters, such as Signal to Interference (SIR) target value is determined by a Network control node, e.g. the Serving Radio Network Controller (SRNC) and sent to a radio base station, called NodeB, alternatively, if the connection is over network interface Iur, via the Drift Radio Network Controller (DRNC). The determination of the SIR target value uses the number of Hybrid automatic repeat request (HARQ) retransmissions that the SRNC receives in the header of an UL Data frame, a so called User Plane Protocol (UP Prot). The Node B then uses the SIR target value, for example, in an Inner Loop Power Control process (ILPC) between a User Equipment (UE) and the Node B. For example, in the uplink it is the ability of the transmitter of the UE to adjust its output power in accordance with one or more Transmit Power Control (TPC) commands received in the downlink from the Node B. The transmitter adjusts its output power in order to keep the received uplink Signal-to-Interference Ratio (SIR) at the given SIR target.

The E-DCH may use soft handover with one E-DCH serving cell plus one or more E-DCH non serving cells. In single carrier mode all cells are on the same carrier. With one carrier it is enough to have one OLPC process that may involve all the cells of the active set for E-DCH, it is not required to know in which cell the number of HARQ retransmissions has increased for proper setting of the SIR target in all cells of E-DCH active set.

When two or more carriers are introduced the assumption is that soft handover is used on each carrier, i.e. an active set of several cells may exist on each carrier, one cell per carrier is the serving E-DCH cell. Hence, a number of transport carriers will be used up to the SRNC to identify the number of HARQ retransmission with the carrier leading to a signaling that uses a lot of resources.

WO2004091114 discloses a system wherein number of ARQs is used when controlling transmission power of a user equipment. WO2006059172 discloses a system where channel quality is used when controlling transmission power of a user equipment. Document R1-090886 of 3GPP TSG RAN WG1 Meeting #56 in Athens, Greece, 09-3Feb. 2009 Titled Considerations on DC-HSUPA Operation discloses the use of TPC in DC-HSUPA.

SUMMARY

An object of the present solution is to provide a mechanism that is signaling efficient for handling Outer Loop Power Control.

The object is achieved by providing method and nodes according to claims 1, 7, 15, 16.

The object is achieved by providing a method in a radio base station. The method is for handling Outer Loop Power Control of a user equipment in a radio communications network of a multiple cell High Speed Uplink Packet Access configuration. The user equipment is connected to at least two cells using at least two carriers, one cell per carrier. The radio base station is arranged to report the number of hybrid automatic repeat requests of the two or more carriers to a network control node. The radio base station and the network control node are comprised in the radio communications network. The radio base station determines a number of hybrid automatic repeat requests over a first carrier of the at least two or more carriers. Then, the radio base station signals, in a user plane frame, to the network control node the determined number of hybrid automatic repeat requests and an identity associated to the first carrier. Thus, the network control node is enabled to control an Outer Loop Power Control parameter to be used in an Outer Loop Power Control process for the first carrier.

According to another aspect of the invention the object is achieved by providing a radio base station. The radio base station enables Outer Loop Power Control of the user equipment in the radio communications network of the multiple cell High Speed Uplink Packet Access configuration. The user equipment is configured to be connected to at least two cells using at least two carriers, one cell per carrier, and the radio base station is configured to report the number of hybrid automatic repeat requests of the two or more carriers to the network control node. The radio base station and the network control node are arranged to be comprised in the radio communications network. The radio base station comprises a determining circuitry configured to determine a number of hybrid automatic repeat requests over the first carrier of the at least two or more carriers. The radio base station further comprises a signalling circuitry coupled to the determining circuitry and configured to signal in the user plane frame to the network control node the determined number of hybrid automatic repeat requests and the identity associated to the first carrier. The user plane frame enables the network control node to control the Outer Loop Power Control parameter to be used in the Outer Loop Power Control process for the first carrier.

According to another aspect of the invention the object is achieved by providing a method in the network control node for determining the Outer Loop Power Control parameter of the Outer Loop Power Control of the first carrier in a cell. The cell is comprised in the radio communications network of the multiple cell High Speed Uplink Packet Access configuration. The user equipment is connected to at least two cells and uses one carrier per cell, the first carrier and a second carrier. The radio base station is arranged to report a number of hybrid automatic repeat requests of the first carrier to the network control node. The network control node and the radio base station are comprised in the radio communications network. The network control node receives the user plane frame comprising indication of the number of hybrid automatic repeat requests and an identity associated to the first carrier from the radio base station. The network control node uses the number of hybrid automatic repeat requests and the identity comprised in the user plane frame to associate the number of hybrid automatic repeat requests with a present Outer Loop Power Control Process of the first carrier. The network control node further determines the Outer Loop Power Control parameter for the first carrier based on the associated number of hybrid automatic repeat requests with the present Outer Loop Power Control process.

According to another aspect of the invention the object is achieved by providing a network control node. The network control node is configured to determine the Outer Loop Power Control parameter of the Outer Loop Power Control of the first carrier in a cell of a radio communications network of a multiple cell High Speed Uplink Packet Access configuration. The user equipment is arranged to be connected to at least two cells and is configured to use one carrier per cell, the first carrier and the second carrier, and the radio base station is configured to report the number of hybrid automatic repeat requests of the first carrier to the network control node. The network control node and radio base station are configured to be comprised in the radio communications network.

The network control node comprises a receiving circuitry configured to receive the user plane frame comprising the indication of the number of hybrid automatic repeat requests and the identity associated to the first carrier from the radio base station. The network control node also comprises an associating circuitry coupled to the receiving circuitry and configured to use the number of hybrid automatic repeat requests and the identity comprised in the user plane frame to associate the number of hybrid automatic repeat requests with the present Outer Loop Power Control Process of the first carrier. Furthermore, the network control node comprises a determining circuitry coupled to the associating circuitry and configured to determine the Outer Loop Power Control parameter for the first carrier based on the associated number of hybrid automatic repeat requests with the present Outer Loop Power Control process.

With two or more carriers, e.g. as in Dual Cell HSUPA, several independent open loops for power control is required, one per carrier. To be able to determine correct OLPC parameters to use on each carrier the network control node, such as an SRNC, needs information on which carrier, for example, primary, "secondary a", "secondary b" . . . , a frame was received to be able to associate the Number of HARQ Retransmissions information Element (IE) in the UP frame or UP Prot, with the correct carrier with its OLPC, and hence be able to control the SIR target for the correct carrier. Thus, a mechanism that enables the network control node to identify the correct carrier with the HARQ Retransmissions information Element (IE) in the UP frame for handling Outer Loop Power Control in a signaling efficient manner is provided.

Embodiments herein disclose ways to adjust OLPC process of a carrier by introducing, for example, a Power Control Loop Identity or a carrier identity that is used to identify which OLPC process that is relevant to adjust in the evaluation algorithm in the SRNC when receiving the Number of HARQ Retransmissions IE in the UP frame. Current UP frame format or UP protocol has four spare bits in the header that may in some embodiments be used.

BRIEF DESCRIPTION OF THE DRAWINGS

Embodiments will now be described in more detail in relation to the enclosed drawings, in which.

DETAILED DESCRIPTION

Figure 1:
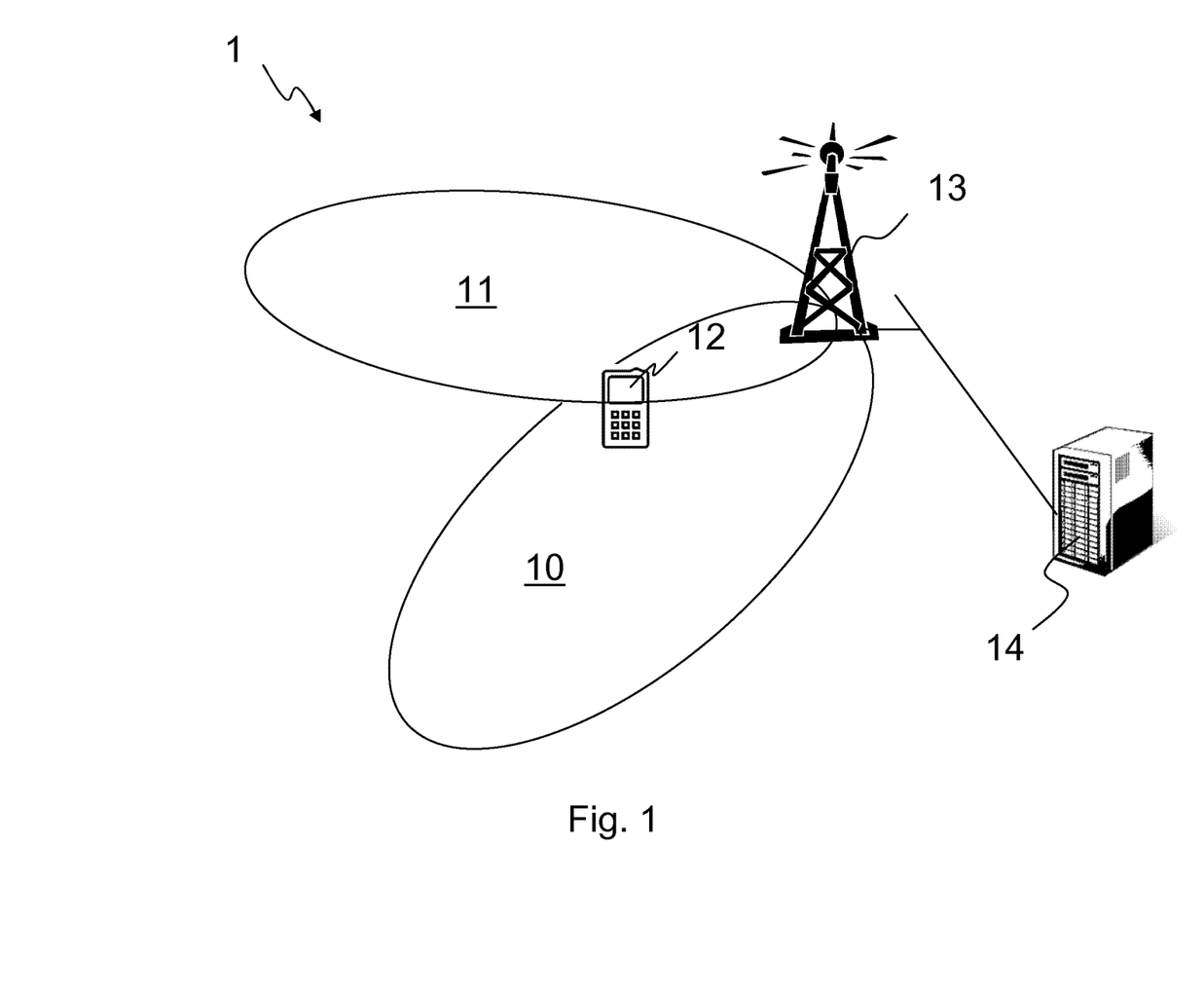
FIG. 1 is a block diagram depicting a schematic overview of a radio communications network.

In FIG. 1 a schematic overview of a radio communications network 1. As shown, the radio communications network 1 is a cellular system and comprises a number of cells, a first cell 10 and a second cell 11 are shown in FIG. 1. Each cell may comprise a number of user terminals, with the generic name "UE", User Equipment, one is shown as a user equipment 12. The user equipment 12 is exemplified as a mobile phone but may be any data communicating terminal. When two carriers are used for the user equipment 12, the first cell 10 and second cell 11 are overlapping and the user equipment 12 communicates, i.e. has a physical connection, in both cells. That is, the user equipment 12 is connected to the first cell 10 and the second cell 11, and has a connection on the physical layer in RAN1 terminology in at least one cell per carrier.

For each cell in the radio communications network 1, there is a controlling node also know as a network communication node, generically referred to as a NodeB, which is shown and denoted as radio base station, RBS 13 in FIG. 1. One role of the RBS 13 is that all traffic to and from the user equipments 12 in the cells 10,11 is routed via the RBS 13. The telecommunications network 1 may comprise a Wideband Code Division Multiple Access (WCDMA) network as well as other networks such as Long Term Evolution (LTE) network, Global System for Mobile communications (GSM) or the like. An RBS may be denoted as NodeB or eNodeB in some of the networks.

Furthermore, the radio communications network 1 comprises a network control node 14, such as a radio network controller (RNC), a Serving Radio Network Controller (SRNC), a Drift Radio network controller (DRNC) or the like. The network control node 14 is arranged to send power control parameter to be used to control transmission power of the user equipment 12. This may be performed in that the network control node 14 transmits Outer Loop Power Control (OLPC) parameters, such as a Signal to Interference ratio (SIR) target value, to the radio base station 13, which is its turn, transmits a transmission power control message to the UE 12 indicating if a change is needed. The change is determined by comparing SIR estimate with the SIR target at the radio base station 13.

The SIR target is determined at the network control node 14 based on the number of Hybrid Automatic Repeat Request (HARQ) retransmissions indicated to the network control node 14 from the radio base station 13 in a header of a User Plane (UP) Data frame.

The radio base station 13 uses two or more carriers, for example radio links (RL), wherein one cell per carrier is reported to the network control node 14 over the same transport bearer. With two or more carriers several independent open loops for power control is required, one per carrier. To be able to determine correct OLPC parameters to use on each carrier the network control node 14 needs information on which carrier, for example, primary, "secondary a", "secondary b"—link, a frame was received to be able to associate the Number of HARQ Retransmissions Information Element (IE) in the UP Data frame or UP Protocol with the correct carrier with its OLPC, and hence be able to control the SIR target for the correct carrier.

Hence, a Power Control Loop Identity or a carrier identity that is used to identify which OLPC process that is relevant to adjust in the evaluation algorithm in the network control node 14 when receiving the Number of HARQ Retransmissions IE in the UP frame is provided.

The solution solves the problem with the current standard, namely to associate a received Number of HARQ Retransmissions IE with the correct OLPC process. It may reuse the four spare bits of current standard UP data frame. The association may be implicitly associated by indicating a carrier or frequency identity, or explicitly associated by indicating an OLPC identity in the UP data frame.

Figure 2:
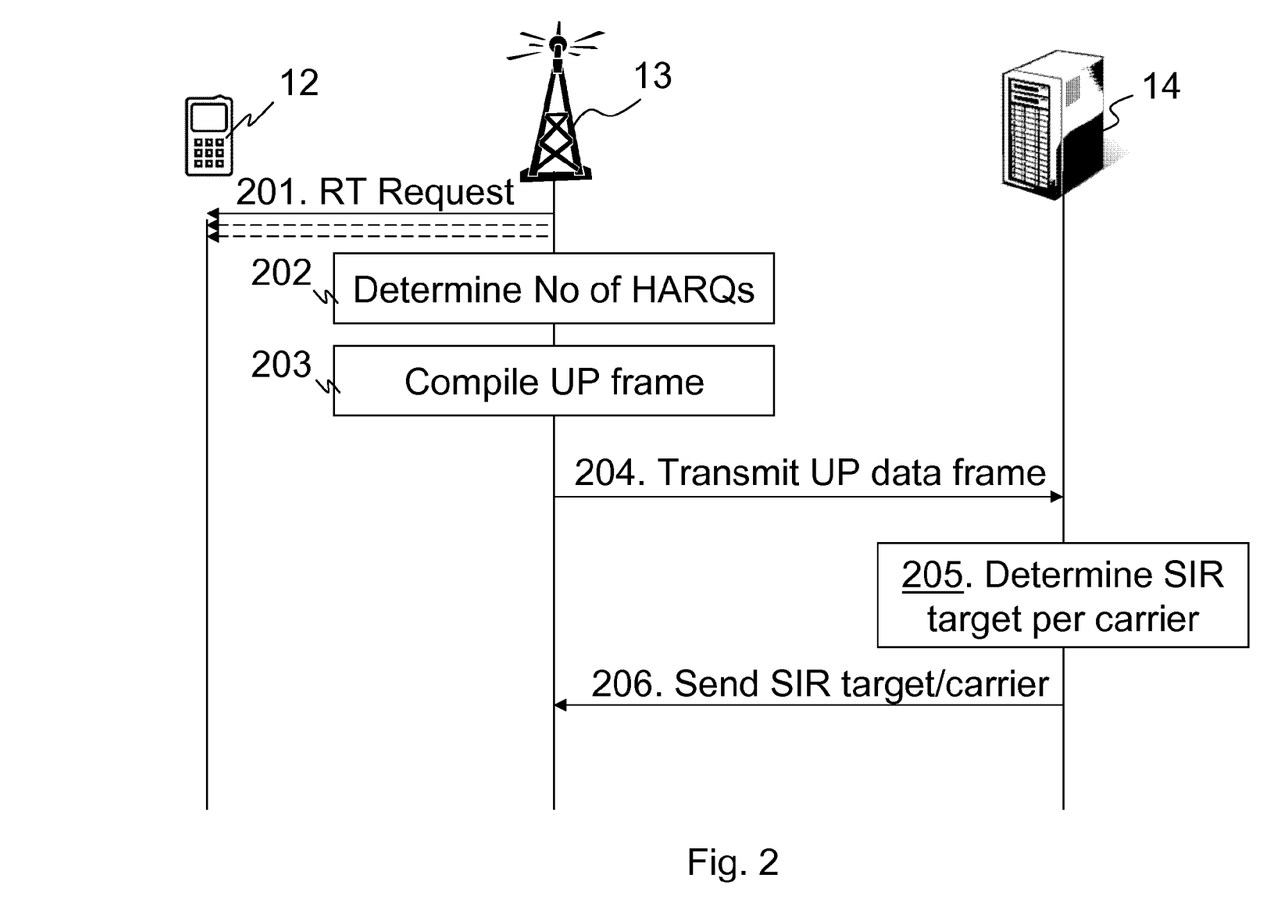
FIG. 2 is a combined signalling and flow chart depicting a method in a radio communications network.

FIG. 2 shows a schematic combined signaling and flowchart in the radio communications network. The user equipment 12 is connected to at least two cells and uses a carrier per cell, a first carrier of the first cell 10 and a second carrier of the second cell 11. The user equipment 12 is sending coded data blocks to the radio base station 13.

Step 201. If, for example, the channel quality is bad, and not all transmission errors can be corrected over the first carrier, the radio base station 13 detects this situation by using an error-detection code. The received coded data block is discarded and a retransmission is requested by the radio base station 13. That is, the radio base station 13 transmits a HARQ of the first carrier, i.e. a HARQ associated to the first carrier. The worse quality of the data transmitted over the first carrier the more HARQs are transmitted by the radio base station 13. Thus, the radio base station 13 may transmit a number of HARQs to the user equipment 12.

Step 202. The radio base station 13 then determines, i.e. establishes, the number of transmitted HARQs of the first carrier.

Step 203. Furthermore, the radio base station 13 compiles a user plane (UP) frame, e.g. network interface Iub/Iur user plane frame, comprising an indication of the number of transmitted HARQs of the first carrier and also an identity associated with the first carrier, such as a frequency identity. Thus, the Number of HARQs is associated with the correct OLPC process and a network interface Iub/Iur transport bearer up to the control network node may be setup for each Medium Access Control-dedicated (MAC-d) identity or rather all logical channels with the same MAC-d identity.

In case of dual cell operation or Multi Cell E-DCH operation, two different transport bearer modes may be used. In E-DCH UL flow multiplexing mode, the radio base station 13 may select the transport bearer that is associated to the logical channel on which the HARQ retransmission occurred and the UE, and may include Uplink Multiplexing Information (UL Mux Info) into the user plane frame to indicate on which frequency the HARQ failure happens, e.g. a primary UL frequency or a secondary UL frequency.

In separate Iub transport bearer mode, the radio base station 13 may select the transport bearer that is associated to the logical channel and the frequency on which the HARQ retransmission occurred Step 204. The radio base station 13 transmits, i.e. signals, the user plane frame to the Network Control node 14, which user plane frame comprises the identity associated with the first carrier. The radio base station 13 may multiplex user plane frames of different carriers over the same single transport bearer. Hence, in order to determine which carrier that is reported on the single transport bearer the user plane frame is associated to an identity associated to the carrier.

In some embodiments, a Power Control Loop Identity is included in the UP frame for the first carrier, for example a Radio Link (RL), when the Radio Link is setup, i.e. one of primary RL, "secondary a" RL, "secondary b" RL. The same identity may then be signalled on Node B Application Part (NBAP) between the radio base station 13 and the network control node 14, such as SRNC, and on Radio Network Subsystem Application Part (RNSAP) between the SRNC and a DRNC. The Power Control Loop Identity uniquely identifies the OLPC to be used i.e. it implicitly defines the carrier used by the RL.

When the Power Control Loop Identity is set for a multi carrier E-DCH radio link, for example, primary RL, "secondary a" RL, "secondary b" RL . . . , and radio base station 13 receives a transport block over a network Uu interface. The radio base station 13 includes the transport block in the network interface Iub UP frame or UP prot, and also the Power Control Loop Identity associated with the RL (cell) in which the transport block was received.

In other embodiments, instead of directly providing an identity of the OLPC that is freely assigned by SRNC, a fixed carrier identity may be used in the same way. Such a carrier identity may comprise a frequency identity or the like. A frequency identity may be denoted a multiplexing mode information indicating the frequency.

The identity per carrier that may fit in 4 bits may be configured by Operations and Maintenance node, Standardised or the like.

Alternatively, a UTRA Absolute Radio Frequency Channel Number (UARFCN), or a shorter derivation from the UARFCN definition, may be included in the UP frame. The UARFCN does not fit in 4 bits, and an extension of several octets is needed in the UP frame.

If there is no one-to-one relationship between the carrier in a multi carrier E-DCH operation and the OLPC process, instead of defining the identity allocated by radio network node 14 as an OLPC identity it can be defined as a carrier identity, also allocated in the same way as for the OLPC identity, but with another definition.

Step 205. When the network control node 14, such as the SRNC, receives the UP frame it uses the Number of HARQ Retransmissions IE and the Power Control Loop Identity both contained in the UP frame to determine the OLPC parameters for the correct carrier. Thus, the network control node 14 determines an Outer Loop Power Control parameter for the first carrier based on the number of HARQs of the first carrier using a present Outer Loop Power Control process. The network control node 14 may then determine that an adjustment of the Outer Loop Power Control process may be required to improve the transmission over the first carrier with less HARQs. For example, the network control node 14 determines an updated SIR target for the first carrier to be transmitted to the radio base station 13. The Outer Loop Power Control parameter of the present Outer Loop Power Control process may be stored in association with the first carrier identity in the network control node 14. Thus, the network control node 14 may know, based on the first carrier identity, the present Outer Loop Power Control parameter of the first carrier.

Step 206. The network control node 14 transmits, i.e. sends, the updated SIR target to the radio base station 13. The updated SIR target is a value that may be applied in the transmitter inner loop power control and may cause the user equipment 12 to alter the transmission power. For example, the SIR target may be used as an initial start value in an inner loop power control process.

Hence, a mechanism that is signaling efficient for handling Outer Loop Power Control is provided. The network control node 14 may determine the correct carrier associated with an outer loop power control and may adjust the settings in an accurate manner. The indication is signaled efficiently from the radio base station 13 to the network control node 14.

Figure 3:
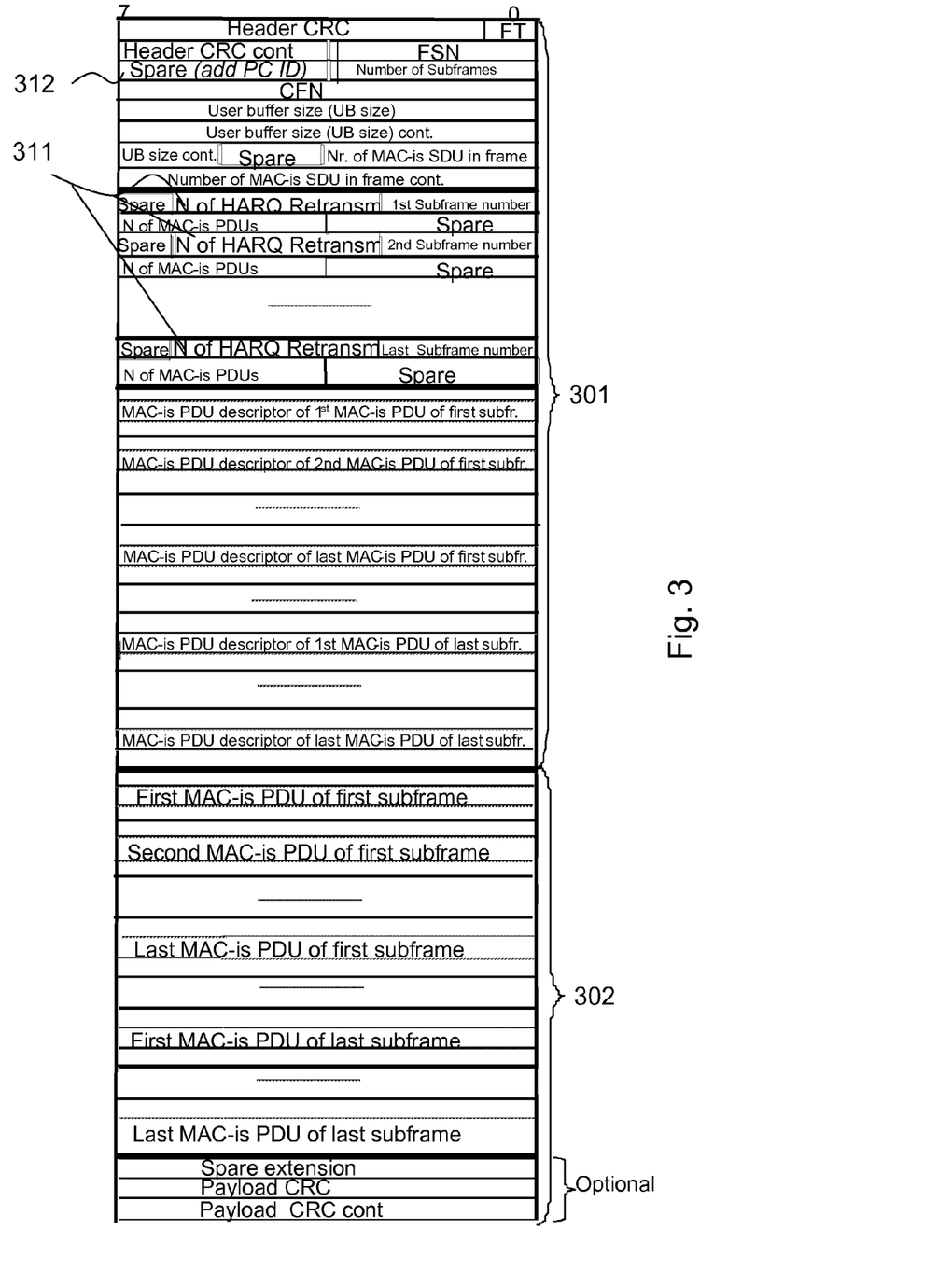
FIG. 3 is a block diagram depicting a user plane frame.

FIG. 3 is a schematic overview depicting a user plane (UP) frame 300.

The user plane frame comprises a frame header 301 and a frame payload 302. The frame header 301 comprises a first bit field 311 comprising the indication of number of HARQ of a carrier. The indication indicates the number of HARQ retransmissions used for successful decoding of the payload, or in case of HARQ decoding failure the number of HARQ retransmissions that were used at the time when the HARQ decoding failure was detected. The indication may also indicate that the actual number of retransmissions is inappropriate as input to the outer loop power control or indicate that the radio base station 13 could not calculate the number of HARQ retransmissions. Furthermore, the user plane frame comprises a second bit field 312 indicating an identity associated with the carrier. The identity may be included in spare bits in the original user plane frame. The identity may be expressed as a power control identity (PC ID) or in Dual cell operation in E-DCH UL flow multiplexing mode, information indicating the frequency of the cell in which the user plane frame was received, e.g. primary UL frequency or secondary UL frequency.

Primary UL frequency Value="0"
Secondary UL frequency Value="1"
UP frame of 25.427 (chapter 6.2.2.3) [UP prot], structure of the E-DCH UL DATA FRAME TYPE 2, is shown in FIG. 3 and the spare bits to use is for example the four spare bits of octet #3. TYPE 2 frame structure is used when the E-DCH UL DATA FRAME is carrying MAC-is PDUs.

Furthermore, the frame header may comprise
- Header Cyclic Redundancy Check (CRC)—indicates result of the CRC applied to the remaining part of the header;
- Frame Type (FT)—describes if it is a control frame or a data frame;
- a Frame Sequence Number (FSN) is incremented (modulo 16) for each transmitted data frame, wherein each flow generates its own Frame Sequence and in case E-DCH UL flow multiplexing mode is used for secondary E-DCH, radio base station 13 sets the value per carrier;
- Connection Frame Number (CFN)—indicates as to which radio frame the first data was received on uplink or shall be transmitted on downlink, for E-DCH the Connection Frame Number shall indicate the radio frame when the HARQ process correctly decoded the data,
- User Buffer size—indicates the total size of the UL DATA FRAME TYPE 2 in octets;
- Number of MAC-is Service Data Units (SDU) in frame—indicates total number of MAC-is SDUs in all MAC-is Packet Data Units (PDU) in the UL DATA FRAME TYPE 2, wherein one MAC-is SDU corresponds to one MAC-d PDU and the MAC entities handling the data transfer on the E-DCH are referred to as MAC-is;
- Number of MAC-is PDUs fields—indicates the number of MAC-is PDUs in the user data frame in the payload part for the corresponding subframe number;
- MAC-is PDU descriptor comprising the Length, Logical channel identifier (LCH-ID) and Flag (F) fields mapped directly from the "MAC-i Header n" field (n>0) received over the Uu.

The frame payload 302 may comprises
- MAC-is PDUs of the different subframes;
- Spare Extension is optional and indicates the location where new IEs can in the future be added in a backward compatible way; and
- CRC payload is optional and is the result of the CRC applied to the remaining part of the payload, i.e. from the bit 7 of the first byte of the payload to the bit 0 of the byte of the payload before the Payload CRC IE.

Figure 4:
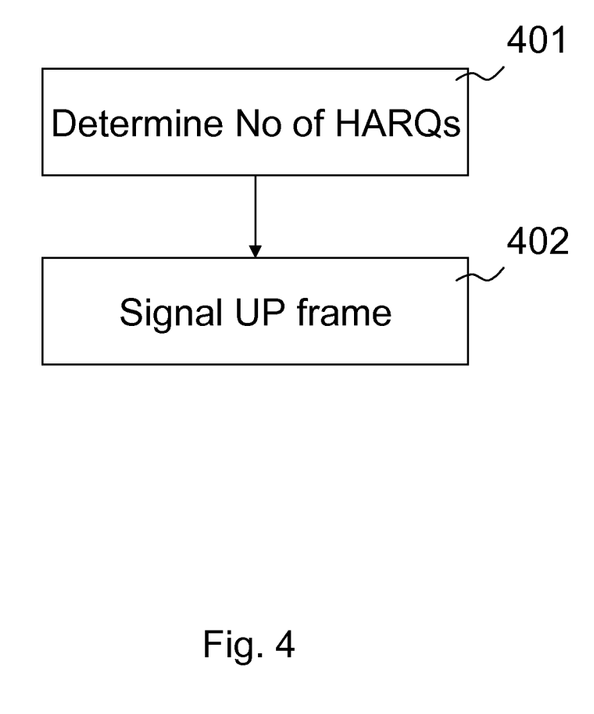
FIG. 4 is a block diagram depicting a method in a radio base station.

The method steps in the radio base station, referred to as radio base station 13 in the figures, for handling Outer Loop Power Control of a user equipment 12 in a radio communications network of a multiple cell HSUPA configuration according to some embodiments will now be described with reference to a flowchart depicted in FIG. 4. The steps do not have to be taken in the order stated below, but may be taken in any suitable order. Multiple cell HSUPA configuration means that the user equipment 12 is connected to at least two cells 10,11 using at least two carriers, one cell per carrier. The radio base station 13 is arranged to report number of hybrid automatic repeat requests of the two or more carriers to the network control node 14. The radio base station 13 and network control node 14 are comprised in the radio communications network such as a WCDMA network or the like.

Step 401: The radio base station 13 determines a number of hybrid automatic repeat requests over a first carrier of the at least two or more carriers. This may be performed by a counter or the like in the radio base station.

Step 402: The radio base station 13 signals in a user plane frame to the network control node 14 the determined number of hybrid automatic repeat requests and an identity associated to the first carrier. The user plane frame enables the network control node 14 to control an Outer Loop Power Control parameter to be used in an Outer Loop Power Control process for the first carrier. The network control node 14 may determine whether the number of hybrid automatic repeat requests are above a preset threshold value and in that case increase the Outer Loop Power Control parameter. The Outer Loop Power Control parameter may comprise SIR target value or the like, which may be used to determine a transmission power value by the radio base station 13, for example, a value in an Inner Loop Power Control process (ILPC) between the user equipment 12 and the radio base station 13. For example, in the uplink it is the ability of the user equipment transmitter to adjust its output power in accordance with one or more TPC commands received in the downlink from the radio base station 13 that keeps the received uplink SIR at the given SIR target.

The identity may comprise a carrier identity and the carrier identity may in some embodiments comprise a frequency identity. Furthermore, the identity may comprise a Power Control Loop identity and may comprise four or less bits in the user plane frame.

It should be noted here that the radio base station 13 may further determine a number of Hybrid automatic repeat requests over a second carrier of the at least two or more. Also, the radio base station 13 may then signal by multiplexing user plane frames of the first and the second carrier over a single transport carrier to a network control node 14. Each user plane frame comprises the determined number of hybrid automatic repeat requests and an identity associating an outer loop power control process to the respectively carrier.

Figure 5:
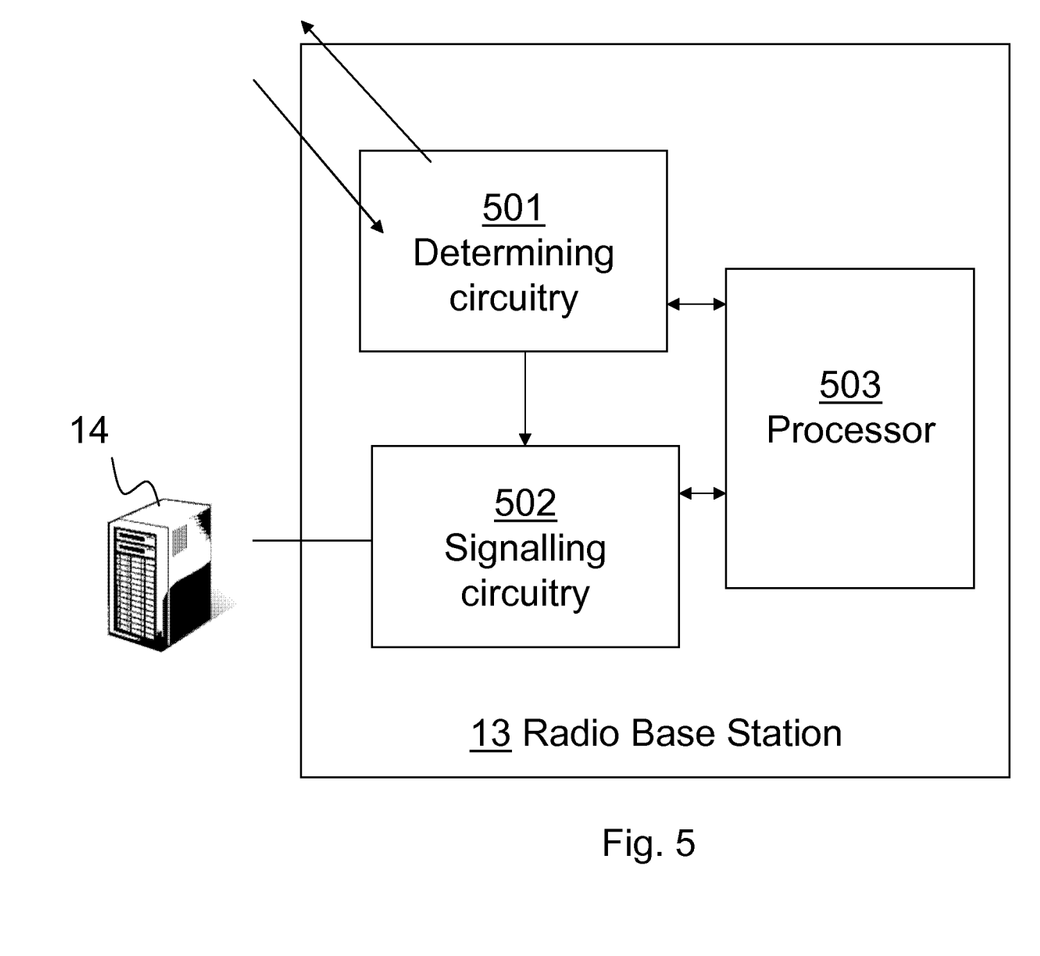
FIG. 5 is a block diagram depicting a schematic overview of the radio base station.

In order to perform the method stated above a radio base station 13 is provided. In FIG. 5 the radio base station 13 for enabling Outer Loop Power Control of the user equipment 12 in the radio communications network of the multiple cell 10,11 High Speed Uplink Packet Access configuration. The user equipment 12 is configured to be connected to at least two cells 10,11 using at least two carriers, one cell per carrier, and the radio base station 13 is configured to report number of hybrid automatic repeat requests of the two or more carriers to a network control node 14. The radio base station 13 and the network control node 14 are arranged to be comprised in the radio communications network.

The radio base station comprises a determining circuitry 501 configured to determine a number of hybrid automatic repeat requests over a first carrier of the at least two or more carriers. Furthermore, the radio base station 13 comprises a signalling circuitry 502 coupled to the determining circuitry 501 and configured to signal in a user plane frame to the network control node 14 the determined number of hybrid automatic repeat requests and an identity associated to the first carrier. The information in the user plane frame enables the network control node 14 to control the Outer Loop Power Control parameter to be used in the Outer Loop Power Control process for the first carrier.

The determining circuitry 501 may further be configured to determine a number of Hybrid automatic repeat requests over a second carrier of the at least two or more. Also, the signalling circuitry 502 may further be configured to signal by multiplexing user plane frames of the first and the second carrier over a single transport carrier to a network control node 14. Each user plane frame comprises the determined number of hybrid automatic repeat requests and an identity associating an outer loop power control process to the respectively carrier.

Figure 6:
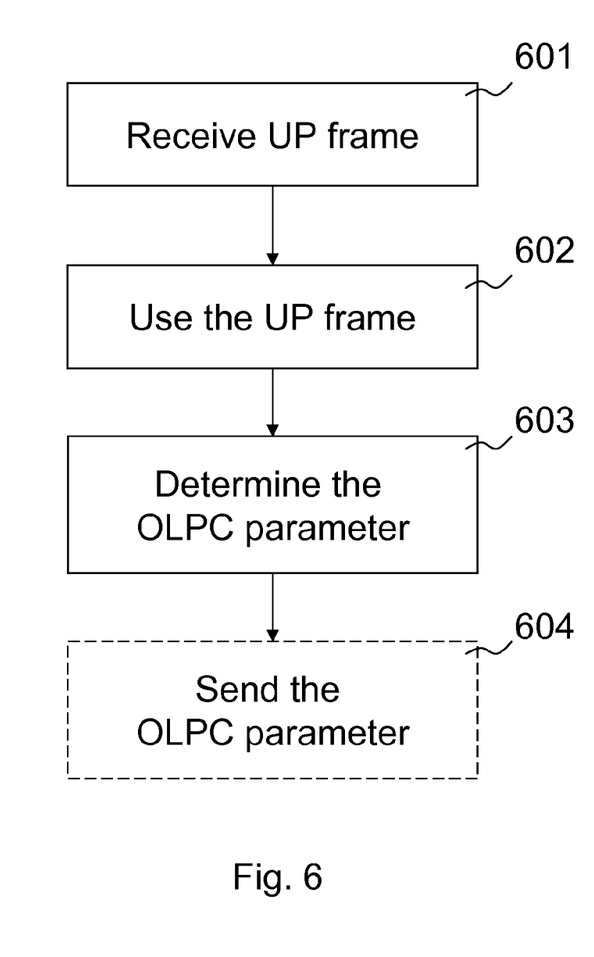
FIG. 6 is a block diagram depicting a method in a network control node.

The method steps in the network control node, referred to as network control node 14 in the figures, for determining an Outer Loop Power Control parameter of an Outer Loop Power Control of a first carrier in a cell of a radio communications network of a multiple cell 10,11 High Speed Uplink Packet Access configuration, according to some embodiments will now be described with reference to a flowchart depicted in FIG. 6. The steps do not have to be taken in the order stated below, but may be taken in any suitable order. The user equipment 12 is connected to at least two cells and uses a carrier per cell, the first carrier and a second carrier, and the radio base station 13 is arranged to report a number of hybrid automatic repeat requests of the first carrier to the network control node 14. The network control node 14 and the radio base station 13 are comprised in the radio communications network.

Step 601. The network control node 14 receives the user plane frame comprising indication of the number of hybrid automatic repeat requests and the identity associated to the first carrier from the radio base station 13. The identity may comprise a carrier identity, such as a frequency identity, or a Power Control Loop identity and may comprise four or less bits in the user plane frame.

The user plane frame may in some embodiments be received from the radio base station 13 via a different network control node 15. For example, the user plane frame may be received at an SRNC from the radio base station via a DRNC over network interface Iur.

Step 602. The network control node 14 uses the number of hybrid automatic repeat requests and the identity comprised in the user plane frame to associate the number of hybrid automatic repeat requests with a present Outer Loop Power Control Process of the first carrier.

Step 603. The network control node 14 then determines the Outer Loop Power Control parameter for the first carrier based on the associated number of hybrid automatic repeat requests with the present Outer Loop Power Control process. In some embodiments, the Outer Loop Power Control parameter comprises a Signal to Interference target value.

Step 604. This is an optional step as indicated by the dashed line. The network control node 14 sends the Outer Loop Power Control parameter to the radio base station 13.

Figure 7:
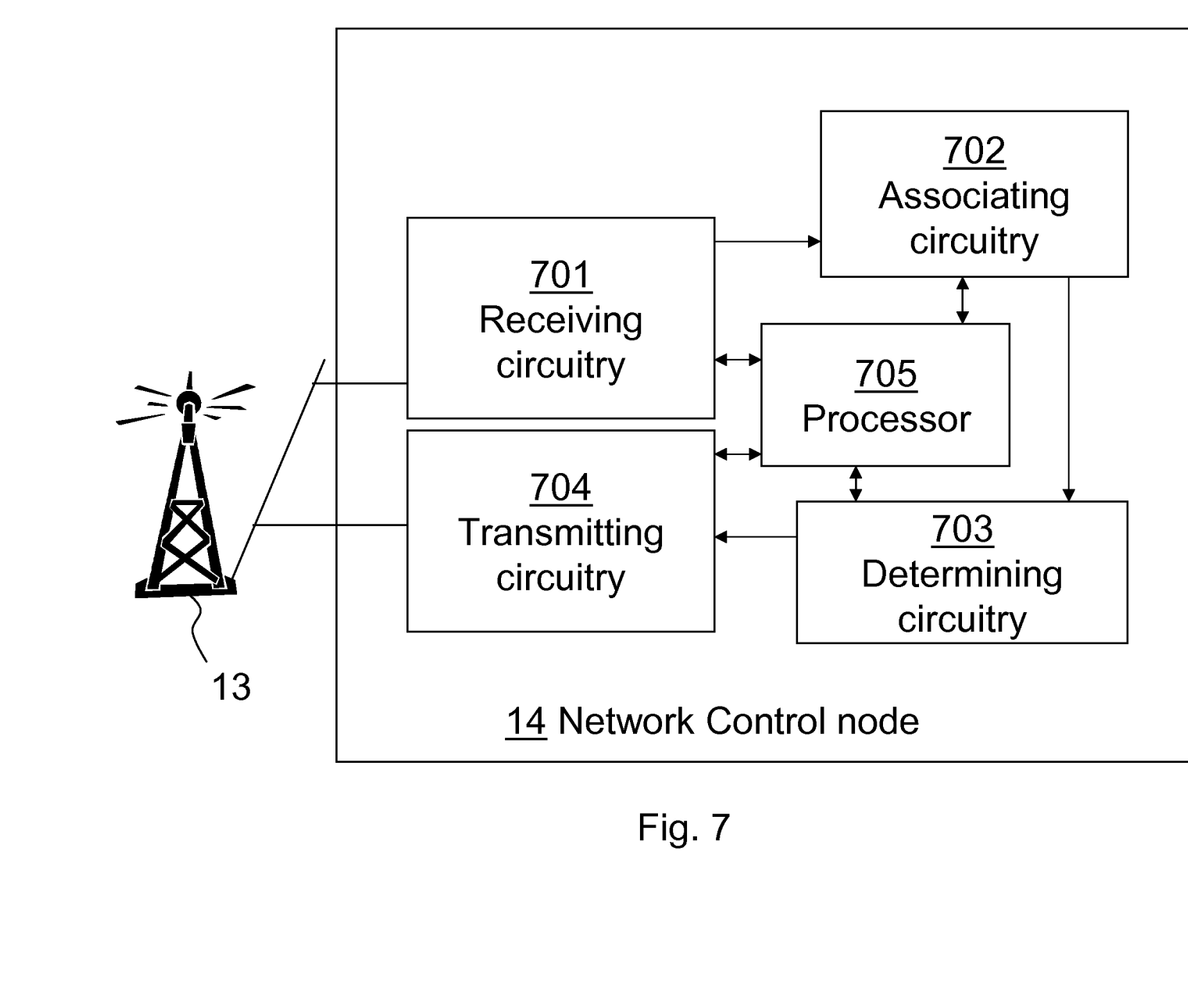
FIG. 7 is a block diagram depicting a schematic overview of the network control node.

In order to perform the method stated above a network control node 14 is provided. In FIG. 7 the network control node 14 is configured to determine an Outer Loop Power Control parameter of a Outer Loop Power Control of a first carrier in a cell of a radio communications network of a multiple cell 10,11 High Speed Uplink Packet Access configuration is shown. The user equipment 12 is connected to at least two cell and uses a carrier per cell, the first carrier and a second carrier, and the radio base station 13 is arranged to report a number of hybrid automatic repeat requests of the first carrier to the network control node 14. The network control node 14 and radio base station 13 are configured to be comprised in the radio communications network.

The network control node comprises a receiving circuitry 701 configured to receive a user plane frame comprising indication of the number of hybrid automatic repeat requests and an identity associated to the first carrier from the radio base station. The network control node also comprises an associating circuitry 702 coupled to the receiving circuitry 701 and configured to use the number of hybrid automatic repeat requests and the identity comprised in the user plane frame to associate the number of hybrid automatic repeat requests with a present Outer Loop Power Control Process of the first carrier. Furthermore, the network control node comprises a determining circuitry 703 coupled to the associating circuitry 702 and configured to determine the Outer Loop Power Control parameter for the first carrier based on the associated number of hybrid automatic repeat requests with the present Outer Loop Power Control process.

As stated above, the identity may comprise a carrier identity, such as a frequency identity, or a Power Control Loop identity and may comprise four or less bits in the user plane frame. The user plane frame may in some embodiments be received from the radio base station 13 via a different network control node 15.

In some embodiments, the network control node 14 further comprises a transmitting circuitry 704 coupled to the determining circuitry 704. The transmitting circuitry 704 is configured to send the Outer Loop Power Control parameter to the radio base station 13.

The present mechanism for enabling Outer Loop Power Control may be implemented through one or more processors, such as a processor 503 in the radio base station 13 depicted in FIG. 5 or such as a processor 705 in the network control node 14 depicted in FIG. 7, together with computer program code for performing the functions of the present solution. The program code mentioned above may also be provided as a computer program product, for instance in the form of a data carrier carrying computer program code for performing the present solution when being loaded into the radio base station 13 or the network control node 14. One such carrier may be in the form of a CD ROM disc. It is however feasible with other data carriers such as a memory stick. The computer program code may furthermore be provided as pure program code on a server and downloaded to the radio base station 13 or the network control node 14.

Hence, embodiments herein provide a mechanism for handling Outer Loop Power Control that is signaling efficient.

When multiple cell HSDPA, such as Dual-Cell HSDPA, was introduced an additional information element structure was introduced to define a secondary serving HS-DSCH Radio Link in the procedures Radio Link Setup, Radio Link Addition and Radio Link Reconfiguration. This because the HSDPA channel is not combined with soft handover, hence the structure of NBAP and RNSAP does not allow several HSDPA RL toward one UE. For E-DCH several E-DCH RLs may be included in the active set. The NBAP/RNSAP structure therefore includes RL specific information for E-DCH RLs. This structure may be reused to minimize the impact on the protocol. So in order to minimize the impact on NBAP/RNSAP the current E-DCH RL handling for soft handover may be reused.

The network control node 14, for example a SRNC, sets the Outer Loop Power Control (OLPC) parameters based on the number of HARQ retransmissions that is received in the Iub/Iur UP Data frame. With one carrier it is enough to have one OLPC that may involve all the cells of the active set for E-DCH. With two carriers two independent open loops for power control may be required, one per carrier. The SRNC then obtains information on which carrier, primary or secondary, a frame was received to be able to associate the Number of HARQ Retransmissions IE in the Iub/Iur UP frame with the correct OLPC process, and hence control the SIR target for the correct carrier. There are a number of spare bits in the header of the E-DCH frame in the Iub/Iur UP protocol that can be used for this purpose. A new frame type is not needed in the Iub/Iur user plane protocol. Information (e.g. an identity or a flag) on which carrier a frame was received is to be included in the Iub/Iur UP frame, e.g. in spare bits of the header.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation, the scope of the invention being defined by the following claims.

The invention claimed is:

1. A method implemented in a radio base station for handling outer loop power control of a user equipment in a radio communications network of a multiple cell High Speed Uplink Packet Access configuration, said user equipment being connected to at least two cells using at least two carriers, one cell per carrier, wherein the radio base station is configured to report the number of hybrid automatic repeat requests of the two or more carriers to a network control node, said radio base station and said network control node included in the radio communications network and said method comprising:

determining a number of hybrid automatic repeat requests over a first carrier of the at least two or more carriers;

determining a number of hybrid automatic repeat requests over a second carrier of the at least two or more carriers; and signalling, in a user plane frame to the network control node, the determined number of hybrid automatic repeat requests over the first and second carriers, the determined number of hybrid automatic repeat requests over the second carrier, and an identity identifying the first carrier or an outer loop power control process for the first carrier to enable the network control node to control an outer loop power control parameter to be used in the outer loop power control process for the first carrier, wherein the signalling is performed by multiplexing user plane frames of the first and the second carriers over a single transport carrier to the network control node.

2. The method according to claim 1, wherein the outer loop power control parameter comprises a signal to interference target value.

3. The method according to claim 1, wherein the identity comprises a carrier identity for the first carrier.

4. The method according to claim 3, wherein the carrier identity comprises a frequency identity for the first carrier.

5. The method according to claim 1, wherein the identity comprises a power control loop identity for the first carrier.

6. The method according to claim 1, wherein the identity comprises four or less bits.

7. A method implemented in a network control node for determining an outer loop power control parameter of an outer loop power control of a first carrier in a cell of a radio communications network of a multiple cell High Speed Uplink Packet Access configuration, wherein a user equipment in the radio communications network connects to at least two cells and uses the first carrier for a first cell and the second carrier for a second cell, and wherein a radio base station is configured to report a number of hybrid automatic repeat requests of the first carrier to the network control node, said network control node and said radio base station included in the radio communications network and said method comprising:

receiving, from the radio base station, a user plane frame comprising an indication of the number of hybrid automatic repeat requests over the first carrier, the number of hybrid automatic repeat requests over the second carrier, and an identity identifying the first carrier or an outer loop power control process for the first carrier, said user plane frame having been multiplexed with a user plane frame of the second carrier over a single transport carrier to the network control node;

using the number of hybrid automatic repeat requests and the identity comprised in the user plane frame of the first carrier to associate the number of hybrid automatic repeat requests with a present outer loop power control process of the first carrier; and determining the outer loop power control parameter for the first carrier based on the associated number of hybrid automatic repeat requests with the present outer loop power control process.

8. The method according to claim 7, wherein the outer loop power control parameter comprises a signal to interference target value.

9. The method according to claim 7, wherein the identity comprises a carrier identity for the first carrier.

10. The method according to claim 9, wherein the carrier identity comprises a frequency identity for the first carrier.

11. The method according to claim 7, wherein the identity comprises a power control loop identity for the first carrier.

12. The method according to claim 7, wherein the identity comprises four or less bits.

13. The method according to claim 7, further comprising sending the outer loop power control parameter to the radio base station.

14. The method according to claim 7, wherein the user plane frame is received from the radio base station via a different network control node.

15. A radio base station for enabling outer loop power control of a user equipment in a radio communications network of a multiple cell High Speed Uplink Packet Access configuration, said user equipment being connected to at least two cells using at least two carriers, one cell per carrier, wherein the radio base station is configured to report a number of hybrid automatic repeat requests of the two or more carriers to a network control node, said radio base station and said network control node included in the radio communications network and said radio base station comprising:

determining circuitry configured to determine a number of hybrid automatic repeat requests over a first carrier of the at least two or more carriers, and to determine a number of hybrid automatic repeat requests over a second carrier of the at least two or more carriers; and     signalling circuitry coupled to the determining circuitry and configured to signal in a user plane frame to the network control node the determined number of hybrid automatic repeat requests over the first carrier, the determined number of hybrid automatic repeat requests over the second carrier, and an identity identifying the first carrier or an outer loop power control process for the first carrier to enable the network control node to control an outer loop power control parameter to be used in the outer loop power control process for the first carrier, said signalling circuitry further configured to multiplex user plane frames of the first and the second carriers over a single transport carrier to the network control node.

16. A network control node configured to determine an outer loop power control parameter of an outer loop power control of a first carrier in a cell of a radio communications network of a multiple cell High Speed Uplink Packet Access configuration, wherein a user equipment in the radio communications network connects to at least two cells and uses the first carrier for a first cell and the second carrier for a second cell, and wherein a radio base station is configured to report a number of hybrid automatic repeat requests of the first carrier to the network control node, said network control node and said radio base station included in the radio communications network and said network control node comprising:

receiving circuitry configured to receive, from the radio base station, a user plane frame comprising an indication of the number of hybrid automatic repeat requests over the first carrier, the number of hybrid automatic repeat requests over the second carrier, and an identity identifying the first carrier or an outer loop power control process for the first carrier, said user plane frame having been multiplexed with a user plane frame of a second carrier over a single transport carrier to the network control node;

associating circuitry coupled to the receiving circuitry and configured to use the number of hybrid automatic repeat requests and the identity comprised in the user plane frame to associate the number of hybrid automatic repeat requests with a present outer loop power control process of the first carrier; and     determining circuitry coupled to the associating circuitry and configured to determine the outer loop power control parameter for the first carrier based on the associated number of hybrid automatic repeat requests with the present outer loop power control process.

\* \* \* \* \*